(12) United States Patent
Licht et al.

(10) Patent No.: US 10,922,668 B2
(45) Date of Patent: Feb. 16, 2021

(54) POINT-OF-SALE (POS) BOT

(71) Applicant: NCR Corporation, Duluth, GA (US)

(72) Inventors: Yehoshua Zvi Licht, Alpharetta, GA (US); Ipsito Ghosh, Kolkata (IN)

(73) Assignee: NCR Corporation, Duluth, GA (US)

(*) Notice: Subject to any disclaimer, the term of this patent is extended or adjusted under 35 U.S.C. 154(b) by 522 days.

(21) Appl. No.: 15/275,022

(22) Filed: Sep. 23, 2016

(65) Prior Publication Data

US 2018/0089654 A1 Mar. 29, 2018

(51) Int. Cl.
| | | |
|---|---|---|
| *G06Q 20/18* | (2012.01) | |
| *G07G 1/00* | (2006.01) | |
| *G06Q 30/06* | (2012.01) | |
| *G06Q 20/20* | (2012.01) | |

(52) U.S. Cl.
CPC ........... *G06Q 20/18* (2013.01); *G06Q 20/20* (2013.01); *G06Q 30/0613* (2013.01); *G07G 1/0009* (2013.01)

(58) Field of Classification Search
CPC .... G06Q 20/20; G06Q 20/18; G06Q 20/1085; G06Q 30/061; G07G 1/0009
See application file for complete search history.

(56) References Cited

U.S. PATENT DOCUMENTS

| 5,839,104 A * | 11/1998 | Miller ................. A47F 9/046 704/251 |
| 6,257,486 B1 * | 7/2001 | Teicher ............... G06K 7/0021 235/380 |
| 9,189,742 B2 * | 11/2015 | London .............. G06Q 30/0613 |
| 9,219,660 B2 * | 12/2015 | Sanches ................ G07F 19/209 |
| 9,870,521 B1 * | 1/2018 | Solh ..................... G06K 9/6267 |
| 2002/0170782 A1 * | 11/2002 | Millikan ................ A47F 9/048 186/61 |
| 2003/0036980 A1 * | 2/2003 | Wren ................. G06Q 30/0631 705/14.54 |
| 2003/0046186 A1 * | 3/2003 | Wren ..................... G06Q 30/02 705/14.4 |
| 2004/0176114 A1 * | 9/2004 | Northcutt .......... H04M 1/72547 455/466 |
| 2007/0016796 A1 * | 1/2007 | Singhal .............. G06Q 20/4014 713/183 |
| 2013/0332346 A1 * | 12/2013 | Wang ..................... G06Q 20/18 705/39 |
| 2014/0052463 A1 * | 2/2014 | Cashman ............... G16H 40/20 705/2 |

(Continued)

OTHER PUBLICATIONS

Ben Fox Rubin. "Amazon's Alexa virtual assistant can now order millions of items", CNET.com Jul. 1, 2016. Retrieved online from: <<https://www.cnet.com/news/amazons-alexa-virtual-assistant-can-now-order-millions-of-items/>> on Jan. 31, 2019. 2 pages.*

(Continued)

*Primary Examiner* — Asfand M Sheikh
(74) *Attorney, Agent, or Firm* — NCR Corporation (57) ABSTRACT

An automated bot is customized for a Point-Of-Sale (POS) terminal and processed on the POS terminal. The bat has access to and can control peripheral devices of the POS terminal. The bat providing transactional and, in some embodiments, non-transactional assistance to a user operating the POS terminal.

9 Claims, 4 Drawing Sheets

(56) References Cited

U.S. PATENT DOCUMENTS

| | | | |
|---|---|---|---|
| 2015/0023489 A1* | 1/2015 | Gao | H04M 3/5166 |
| | | | 379/265.11 |
| 2015/0317628 A1* | 11/2015 | Rossmann | G07F 19/20 |
| | | | 705/43 |
| 2015/0348183 A1* | 12/2015 | McKenna | G06Q 20/1085 |
| | | | 705/43 |
| 2017/0336933 A1* | 11/2017 | Hassel | G06F 3/0481 |
| 2018/0033329 A1* | 2/2018 | Suleiman | G09B 17/04 |
| 2019/0130376 A1* | 5/2019 | Hamilton | G06Q 20/20 |
| 2020/0134597 A1* | 4/2020 | Berdugo | G10L 13/02 |
| 2020/0137230 A1* | 4/2020 | Spohrer | H04M 3/5191 |

OTHER PUBLICATIONS

Hassel, U.S. Appl. No. 62/337,641, dated May 17, 2016.*
Folego, Guilherme, et al. "Pay Voice: Point of Sale Recognition for Visually Impaired People." arXiv preprint arXiv:1812.05740 (2018).*

* cited by examiner

POINT-OF-SALE (POS) BOT

BACKGROUND

A variety of automated assistance modules are flooding the technology market for purposes of assisting individuals with a variety of tasks or needed information. Some examples include APPLE'S® SRI®, AMAZON'S® ECHO®, etc.

To date, these assistance modules are largely generic and have very little customization to the specific types of information or assistance. Moreover, these assistance modules are cloud-based modules because the belief is that updates to these modules are more easily obtained through a server-based delivery mechanism. However, an unintended result of this desire for ease of administration is that these modules are usually not very timely to respond to user queries at times of excessive server load and these modules typically only provide general assistance to the user and not specific assistance that is relevant to the user's current situation or circumstances.

Moreover, as more users become comfortable with these automated assistance modules, new servers have to be added to accommodate the user load and the growth.

SUMMARY

In various embodiments, methods and a system for a Point-Of Sale (POS) automated bot are presented.

According to an embodiment, a method for providing an automated POS bot is presented. Specifically, and in one embodiment, real-time contextual transaction assistance is provided to a user operating a Point-Of-Sale (POS) terminal from the POS terminal during a transaction at the POS terminal and controlling at least one of: existing transactional software and an existing device that is processing the transaction when providing the assistance.

DETAILED DESCRIPTION

Figure 1:
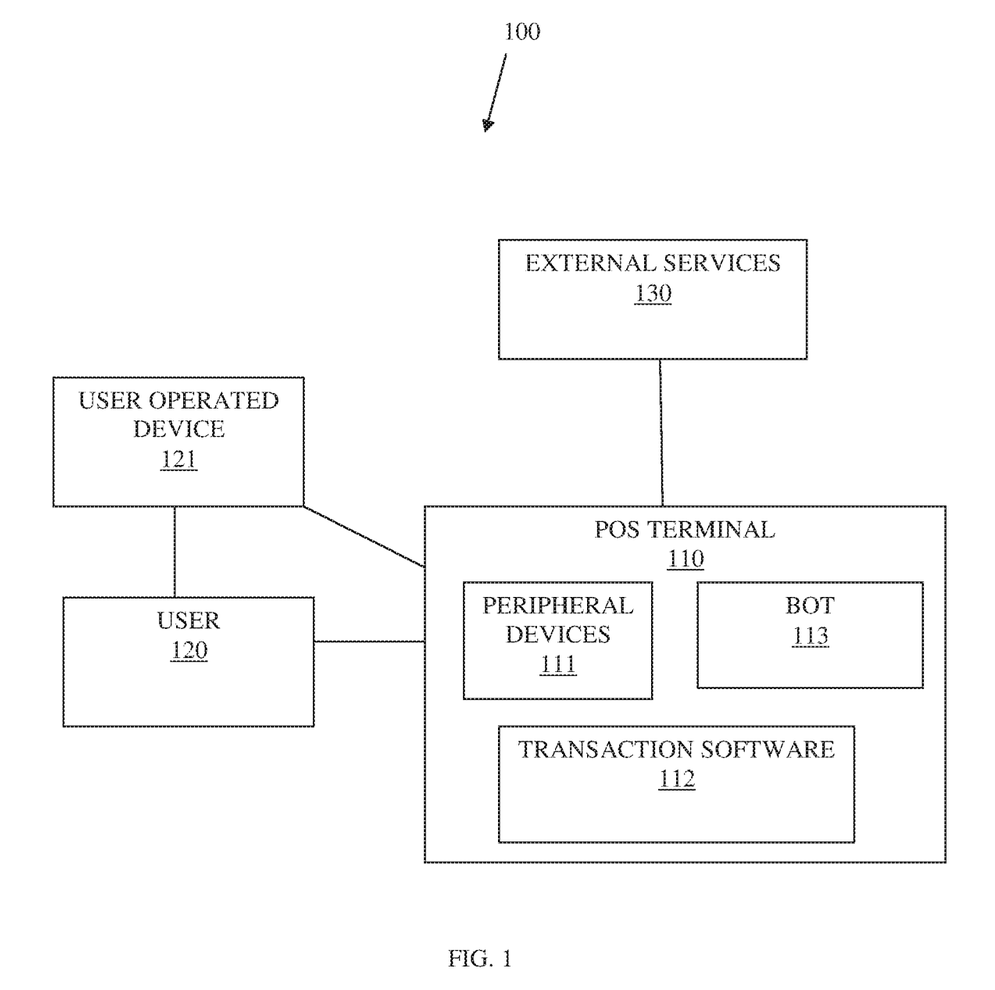
FIG. 1 is a diagram of a system for providing an automated POS bot, according to an example embodiment.

FIG. 1 is a diagram of a system for providing an automated POS bot, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from automated POS bot techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for providing and operating an automated POS bot can be implemented in all, or some combination of the components shown in different hardware computing devices having one or more hardware processors.

The system 100 includes: a POS terminal 110, a user 120, and, optionally, one or more external services 130.

The POS terminal 110 can be any of: a Self-Service Terminal (SST), a kiosk, a self-service grocery checkout station, or a check-out station manned by store personnel.

The POS terminal 110 includes a variety of peripheral devices 111, transaction software 112, and a novel automated bot 113.

The peripheral devices can include: a receipt printer, a card reader, a currency/note acceptor, a currency/note dispenser, a change dispenser, a touch screen, a scanner, a weigh scale, a contactless card reader (enabled for Bluetooth®, Near Field Communication (NFC), Radio Frequency (RF) card detection and reading), wireless communication transceivers (such as for Bluetooth®, WiFi, Low Energy Bluetooth®, etc.), an encrypted Personal Identification Number (PIN) pad (encrypted PINpad), a keyboard, a camera, microphone, speaker, sensors, and others.

The transaction software 112 includes software that permits transactions with the user. The transaction may involve purchases but this does not have to always be the case, as customer may be accessing an ATM (type of POS terminal 110) for purposes of a balance inquiry or the customer may simply need directions or advise about a particular product. However, the transaction software 112 is typically configured with a specific set of types of transactions that the POS terminal 110 is capable of servicing for the location in which it is deployed.

The bot 113 is configured to interact with the transaction software 112 and the peripheral devices 111 of the POS terminal 110 on which the bot 113 is installed. Therefore, when the transaction software 112 has an identity of the user 120 that is interacting with the POS terminal 110 for a transaction, the information is accessible to the bot 113. Moreover, any ongoing transaction details for an ongoing transaction with the user 120 at the POS terminal 110 is accessible to the bot 113. Transaction details can include a variety of information, such as but not limited to, a date and time, a POS terminal identifier, a customer identifier, a customer name, item description, item prices, payment details, card details, and the like.

It is also noted that the bot 113 may be accessible to the user 120 for interaction independent of the user 120 having initiated any transaction with the transaction software 112. That is, a communication session can be initiated between the bot 113 and the user 120 independent of the customer having identified him or herself or having initiated a transaction with the POS terminal 110.

The bot 113 may also access a plurality of external services 130 when engaged in a communication session with the user 120. The external services 130 can include: local networked services that are typically available to the POS terminal 110 (such as a backend server for item lookup information), external network services that are typically available to the POS terminal 110 (such as remote servers associated with enterprise information or enterprise partner information), and external network services that are not available to the POS terminal 110 (such as connections to social media services and the Internet in general with the services available through the Internet).

The bot 113 is also configured to interact with the user through any user operated device 121, such as: a mobile phone, a wearable processing device, a tablet, a laptop, and the like.

The bot 113 can be automatically engaged without the user's request based on a configured event reported from the transaction software 112, such as but not limited to, the customer is entering invalid information for the transaction to proceed, the customer is taking too long to provide the needed information, and the like.

The bot 113 can also be engaged through direct customer request, such as a voice request issued by the user 120 while present or in the proximity of the POS terminal, such that the voice is detected through a microphone peripheral device of the POS terminal 110 and the audio is detected by the BOT 113.

The bot 113 is configured for voice recognition of a spoken voice of the customer and can respond with spoken language through a speaker peripheral of the POS terminal 110 or through a connection between the POS 110 terminal and the user operated device 121 (through speakers integrated into the user operated device 121). The bot 113 may also respond with written language that is in a spoken language recognized by the user 120), the written language responses can be presented on a display peripheral device of the POS terminal 110 or through a connection between the POS terminal 110 and the user operated device through a Short Message Service (SMS) text message or through a specific mobile application that permits the BOT to directly communicate messages. In fact, the bot 113 can respond in both written and spoken language, respond to input provided as speech with returned speech or written text, and respond to input provided as written instructions with returned speech or written text.

When the user is identified, the bat 113 may use an external service 130 to download and configure a known profile for the user, if one exists. The profile may indicate how the user prefers to communicate with the bot (speech written text) and how the user prefers to receive responses from the bot 113 (speech and written text, speech only, text only). The profile may also include preferences settings for the user that is known for the types of transactions that the POS terminal 110 is configured to provide, such as use my loyalty account for a store associated with the POS terminal 110 for any transactions. Still further, the profile can be more detailed when the user 120 is a store clerk that is operating the POS terminal 110, such as how the store clerk prefers thanks to be displayed and presented during operation of the POS terminal 110 by the clerk.

The user profile may also include past speech recognition used with the user 120 that permits the bat 113 to continually learn the speech of learn how the user 120 forms questions for which the user 120 wants an answer to.

During operation, when the bat 113 is initially started a grammar for resolving speech and written questions into user-formed questions is downloaded and processed to configure the bat 113 for providing user assistance. This grammar is customized for the POS terminal 110 based on the POS terminal's location and the type of transactions that are typically available at the POS terminal 113. This makes assistance more accurate than what is available in cloud-based assistance modules that are generic. So, the bot is configured with specific types of questions, words (lexicon), and formats of those words based on the POS terminal's location and available functionality to the user 120. This is significant because each type of POS terminal 110, each physical location, and each type of enterprise where the store resides may have a lexicon and way of expressing things that can be significantly or even subtly different from other POS terminals 110 and their locations. This makes the bot 113 more efficient in terms of resolving formulating the question be asked by the user 120 and resolving an answer for the user 120. This also makes the bot 113 capable of responding faster than traditional cloud-based assistance modules.

The grammar and lexicon are processed during any session with the user 120 (user-initiated or automatically generated on behalf of the user 120 as discussed above) to determine the intent (question or command) and the entity (user or target).

Because the bot 113 resides on the POS terminal 110 and receives real time information from the transaction software 112 and the peripherals 111, the bot can also integrate this information with the command or question from the user to identify a context of the command or question. This is not possible with traditional automated bots.

Moreover, because the bot 113 can access the Internet and external services 130, the bot 113 can become part of and participate in the Internet of Things (IoTs). This means that the bot 113 can perform more than just immediate transaction assistance for the customer in real time for that transaction. But, the bot 113 can also access a variety of resources accessible to the user, such as social media accounts, devices controlled by the user as part of the IoTs and the like.

Aptly, the bot 113 is customized for the user, the transaction that a user may be presently engaged in, the location of the POS terminal 110, the POS terminal type (kiosk, clerk-manned, ATM, SST, etc.) 110, the types of transaction provided by the POS terminal, the peripherals of the POS terminal 110, and external resources/services 130 for which when the identity of the user 120 is confirmed the bot 113 may be given access to.

The bot 113 is a two-way assistance service between the bat 113 and the user 120. The bat 113 is interactive. The bat 113 accounts for the current context and journey (location in a process, such as travel schedule) of the user 120.

The bot 113 can process commands issued (voice or written) from the user 120 to direct a particular peripheral 111 to perform some action, such as print directions to the nearest restaurant or a specific restaurant. Moreover, when the bat 113 is authorized the post can perform external services on behalf of the user 120, such as send a text to my spouse telling here where I am headed and directions to the restaurant and turn on my porch light.

The loot 113 can also interact with the user 120 to successfully complete a transaction at the POS terminal 110, such as the ATM (POS terminal 110) indicates your withdrawal limit for the day is $500 can you put your driver's license in front of the camera and I can get you approval from one of your bank tellers.

The bat 113 can also interact to understand what the customer is trying to say, such as by responding I think you want directions to locate a specific can of soup within the store, is that correct?

The bot 113 can also interactively display on the touchscreen display of the POS terminal 110 what the user 120 is saying as the user 120 is saying it (or on any user operated device 121 through a mobile app). The user 120 may select a word or phrase and change it from the POS terminal or user operated device 121 to correct what the bat 113 believes it originally received. This allows for more realistic and intelligent interaction with the bot 113 and ensures the user 120 see that the bot 113 believes it detected from the user's speech. Again, this is achieved because the bot 113 has access to the peripherals 111 of the POS terminal 110 because the bot 113 is integrated within the POS terminal 110 and customized for the POS terminal 110.

A base version of the bot 113 for a given POS terminal 110 can be retained remotely on a server and periodically updated to reflect the version of the bot 113 executing on the POS terminal 110. Moreover, changes for bug fixes, updates, or upgrades to the bot 113 can be pushed from the server to the POS terminal 113, such that the POS terminal 110 does not have to be physically visited and operated for maintenance and support. Specific profiles, grammars, and lexicons can be stored as separate files that the bot 113 uses to configure itself for the custom operation. These files can be dynamically updated by the bot 113 and stored remotely from the POS terminal 110 for purposes of recovery during POS terminal failure, etc.

One now appreciates, how a POS-specific bot can be provided for purposes of providing real-time, contextual, and specific transaction assistance to a user 120 operating the POS terminal 110.

The embodiments presented in the FIG. 1 and other embodiments are now discussed with reference to the FIGS. 2-4.

Figure 2:
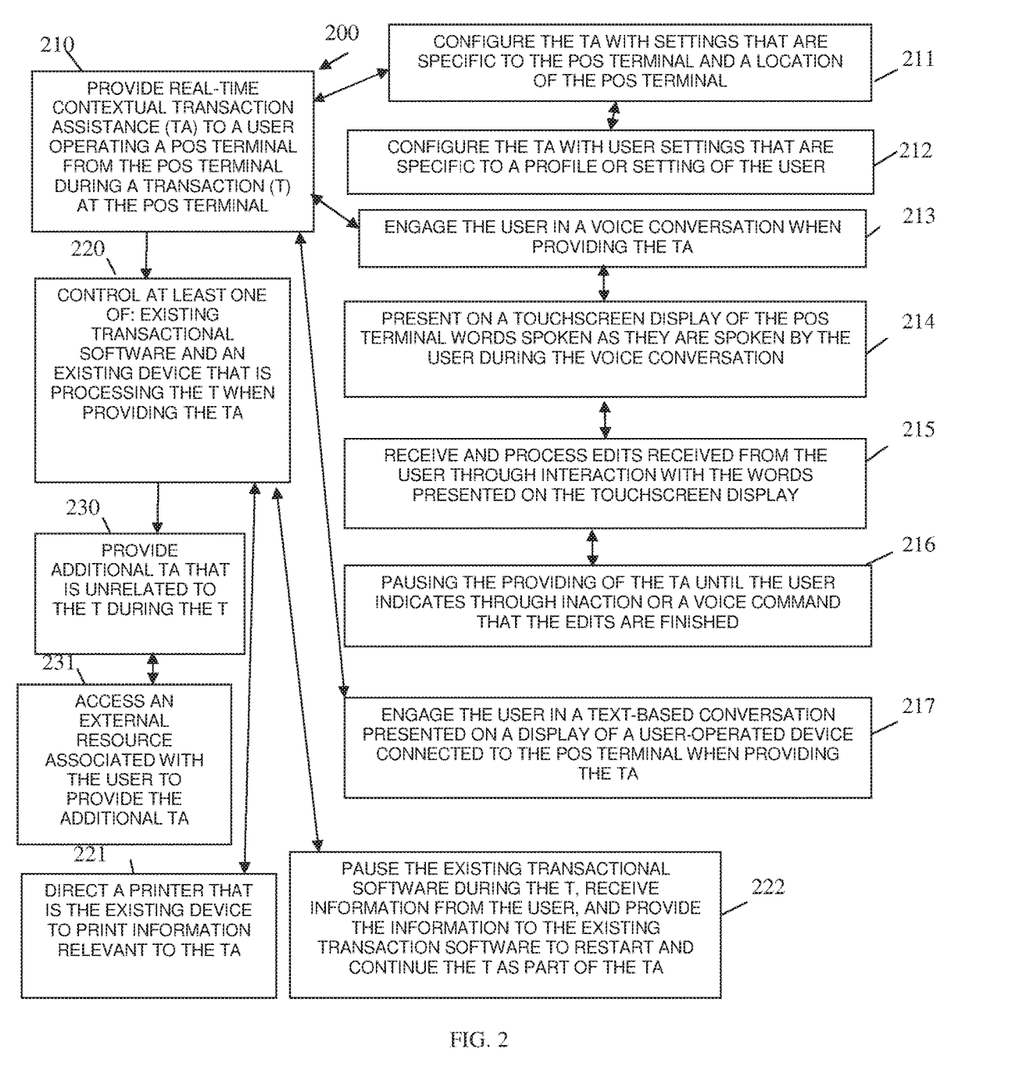
FIG. 2 is a diagram of a method for providing an automated POS bot, according to an example embodiment.

FIG. 2 is a diagram of a method 200 for providing an automated POS bot, according to an example embodiment. The software module(s) that implements the method 200 is referred to as a "POS bot." The POS bot is implemented as executable instructions programmed and residing within memory and/or a non-transitory computer-readable (processor-readable) storage medium and executed by one or more hardware processors of a hardware computing device. The processors of the device that executes the POS bot are specifically configured and programmed to process the POS bot. The POS bot has access to one or more networks during its processing. The networks can be wired, wireless, or a combination of wired and wireless.

In an embodiment, the device that executes the POS bot is the POS terminal 110.

In an embodiment, the device that executes the POS bot is a SST. In an embodiment, the SST is one of: a kiosk, a self-service grocery checkout station, and an Automated Teller Machine (ATM).

In an embodiment, the POS bot is the bot 113.

At 210, the POS bot provides real-time contextual transaction assistance to a user operating the POS terminal during a transaction at the POS terminal.

According to an embodiment, at 211, the POS bot configures the transaction assistance with settings that are specific to the POS terminal and a location of the POS terminal.

In an embodiment of 211 and at 212, the POS bot configures the transaction assistance with user settings that are specific to a profile or setting of the user.

In an embodiment, at 213, the POS bot engages the user in a two-way interactive voice conversation when providing the transaction assistance.

In an embodiment of 213 and at 214, the POS bot presents on a touchscreen display of the POS terminal words spoken as they are spoken by the user during the voice conversation.

In an embodiment of 214 and at 215, the POS bot receives and processes edits received from the user through interaction with the words presented on the touchscreen display.

In an embodiment of 215 and at 216, the POS bat pauses the providing of the transaction assistance until the user indicates through inaction or a voice command that the edits are finished by the user.

At 220, the POS bot controls at least one of: existing transaction software and an existing device that is processing the transaction when providing the transaction assistance. That is, the POS bot is integrated into the POS terminal and can receive communications and direct communications to devices (peripheral devices) controlled by the existing transaction software, and the POS can receive communications and direct communications to the existing transaction software.

In an embodiment, at 221, the POS bot directs a receipt printer that is the existing device to print information relevant to the transaction assistance at the POS terminal.

In an embodiment, at 222, the POS bot pauses the existing transactional software during the transaction and receives information from the user. Next, the POS bot provides that information to the existing transaction software to restart and continue the transaction as part of the POS bot's provided transaction assistance.

At 230, the POS bot provides additional transaction assistance that is unrelated to the transaction. This was discussed above and include anything accessible to the POS bot or the user through the IoTs.

In an embodiment of 230 and at 231, the POS bot accesses an external resource associated with the user to provide the additional transaction assistance. This can be a device and or a software service, such as messaging platforms associated with the user.

Figure 3:
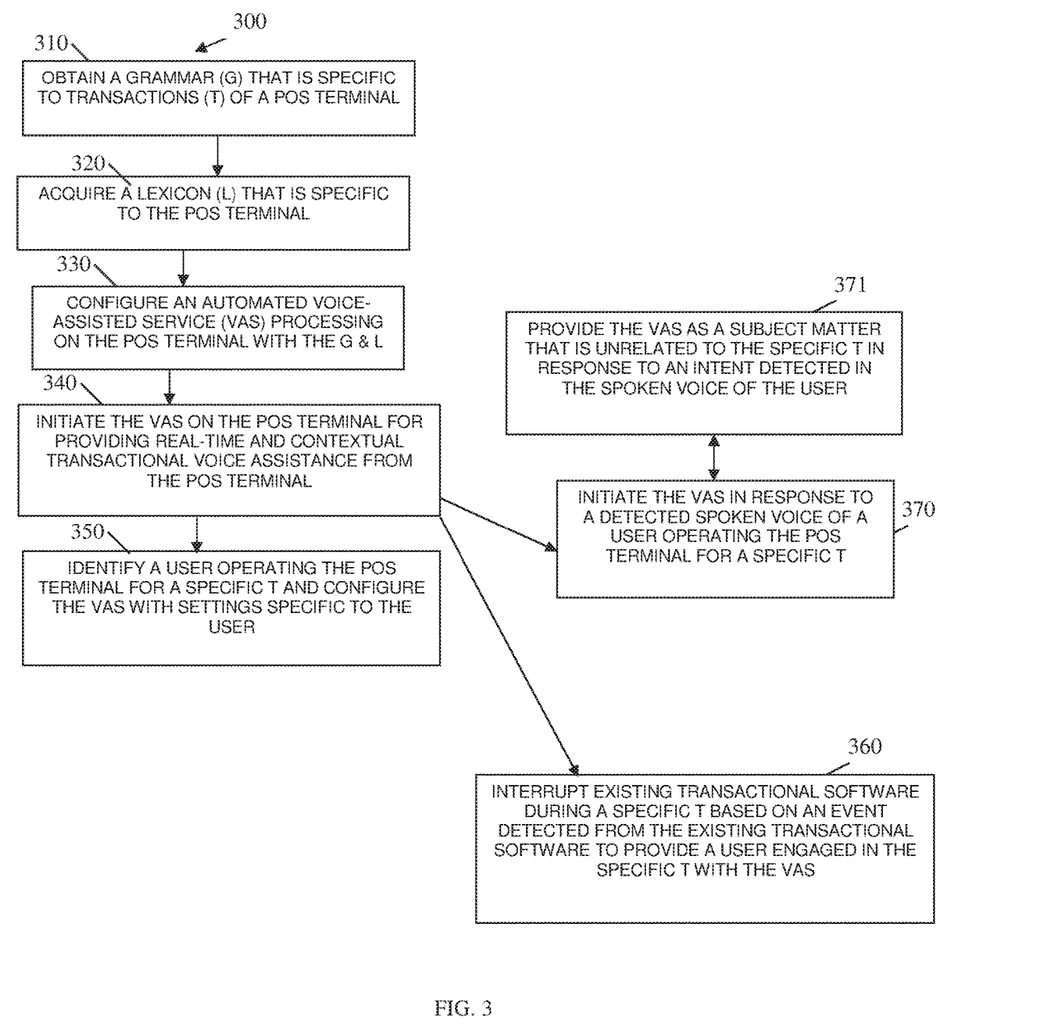
FIG. 3 is a diagram of another method for providing an automated POS bot, according to an example embodiment.

FIG. 3 is a diagram of another method for providing an automated POS bot, according to an example embodiment. The software module(s) that implements the method 300 is referred to as a "transaction device bot." The transaction device bot is implemented as executable instructions programmed and residing within memory and/or a non-transitory computer-readable (processor-readable) storage medium and executed by one or more hardware processors of a hardware device. The processors of the device that executes the transaction device bat are specifically configured and programmed to process the transaction device bat. The transaction device bat has access to one or more networks during its processing. The networks can be wired, wireless, or a combination of wired and wireless.

The transaction device bat presents another and in some ways enhanced perspective of the method 200.

In an embodiment, the transaction device bat is the bat 113.

In an embodiment, the device that executes the transaction device bat is a POS terminal.

In an embodiment, the POS terminal is the POS terminal 110.

In an embodiment, the POS terminal is one of: a SST, a kiosk, a self-service checkout station, and an ATM.

At 310, the transaction device bot obtains a grammar that is specific to transactions of a POS terminal.

At 320, the transaction device bat acquires a lexicon that is specific to the POS terminal.

At 330, the transaction device bat configures an automated voice-assisted service that is processing on the POS terminal with the grammar and the lexicon.

At 340, the transaction device bat initiates the voice-assisted service on the POS terminal for providing real-time and contextual transaction voice-assistance from the POS terminal.

According to an embodiment, at 350, the transaction device bat identifies a user operating the POS terminal for a specific transaction and configures the voice-assisted service with settings that are specific to the user.

In an embodiment, at 360, the transaction device bat interrupts existing transactional software during a specific transaction based on an event detected from the existing transactional software to provide a user engaged in the specific transaction with the voice-assisted service.

In an embodiment, at 370, the transaction device bat initiates the voice-assisted service in response to a detected spoken voice of a user operating the POS terminal for a specific transaction.

In an embodiment of 370 and at 371, the transaction device bot provides the voice-assisted service as a subject matter that is unrelated to the specific transaction in response to an intent detected in the spoken voice of the user.

Figure 4:
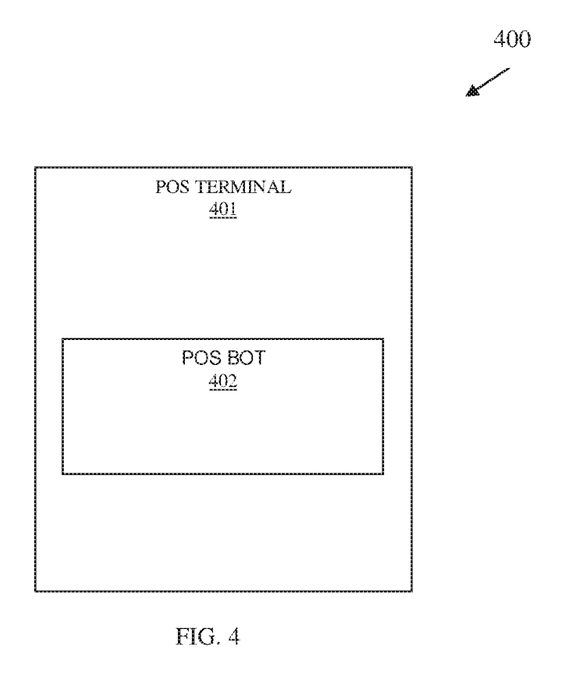
FIG. 4 is a diagram of another system for providing an automated POS bot, according to an example embodiment.

FIG. 4 is a diagram of another system 400 for providing an automated POS bot, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1-3.

In an embodiment, the system 400 implements, inter alia, the method 200 of the FIG. 2.

In an embodiment, the system 400 implements, inter alia, the method 300 of the FIG. 3.

The system 400 includes a POS terminal 401 and the POS terminal including a POS bot 402.

POS bot 402 is configured to: 1) execute on at least one hardware processor of the server 401 and 2) provide two-way automated voice assistance to a user of the POS terminal 401 during a transaction that is configured for the POS terminal 401 and a location of the POS terminal 401.

In an embodiment, the POS terminal 401 is one of: a SST, a cashier-assisted terminal, a kiosk, and an ATM.

In an embodiment, the POS bot 402 is further configured to provide assistance that is directly related to the transaction and provide assistance that is unrelated to the transaction.

In an embodiment, the POS bot is the bot 113.

In an embodiment, the POS bot is the method 200.

In an embodiment, the POS bot is the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing, by executable instructions that execute on a hardware processor of a Point-of-Sale (POS) terminal from a non-transitory computer-readable storage medium, real-time contextual transaction assistance to a user operating the POS terminal during a transaction at the POS terminal by monitoring the transaction being processed by existing transaction software and initiating the real-time contextual transaction assistance based on an event raised during the transaction, wherein providing further includes configuring the real-time contextual transaction assistance with user settings that are specific to a profile or setting of the user, wherein providing further includes engaging the user in a voice conversation when providing the real-time contextual transaction assistance by obtaining past speech recognition used with the user from the profile and continually learning speech of the user with respect to how the user forms questions with speech during the voice conversation for the real-time contextual transaction assistance and for subsequent real-time contextual assistances requested by the user;
interacting, by the executable instructions, with the user in a communication session based on the event and obtaining user-provided information;
identifying, by the executable instructions, a context for the real-time contextual transaction assistance based on the user-provided information and based on real-time information reported from the existing transaction software and a peripheral device interfaced to the POS terminal during the transaction; and
controlling, by the executable instructions, the existing transactional software and the peripheral device based on the context and providing the real-time contextual transaction assistance during the transaction at the POS terminal to the user.

2. The method of claim 1 further comprising, providing, by the executable instructions, additional assistance that is unrelated to the transaction during the transaction.

3. The method of claim 2, wherein providing further includes accessing an external resource associated with the user to provide the additional assistance.

4. The method of claim 1, wherein providing further includes configuring the real-time contextual transaction assistance with settings that are specific to the POS terminal and a location of the POS terminal.

5. The method of claim 1, wherein engaging further includes presenting on a touchscreen display of the POS terminal words spoken as they are spoken by the user during the voice conversation.

6. The method of claim 5 wherein presenting further includes receiving and processing edits received from the user through interaction with the words presented on the touchscreen display.

7. The method of claim 6, wherein receiving further includes pausing providing the real-time contextual transaction assistance until the user indicates through inaction or a voice command that the edits are finished.

8. The method of claim 1, wherein providing further includes engaging the user in a text-based conversation presented on a display of a user-operated device connected to the POS terminal when providing the real-time contextual transaction assistance.

9. The method of claim 1, wherein controlling further includes pausing the existing transactional software during the transaction, receiving the user-provided information from the user, and providing a portion of the user-provided information to the existing transaction software to restart and continue the transaction as part of the real-time contextual transaction assistance.

* * * * *